United States Patent
Stark et al.

(10) Patent No.: US 12,440,795 B2
(45) Date of Patent: Oct. 14, 2025

(54) SECONDARY FILTER ELEMENT AND FILTER SYSTEM

(71) Applicant: Mann+Hummel GmbH, Ludwigsburg (DE)

(72) Inventors: Dennis Stark, Mauer (DE); Sascha Roth, Schwegenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 84 days.

(21) Appl. No.: 17/869,266

(22) Filed: Jul. 20, 2022

(65) Prior Publication Data
US 2023/0028125 A1 Jan. 26, 2023

(30) Foreign Application Priority Data
Jul. 20, 2021 (DE) .......................... 102021118700.1

(51) Int. Cl.
| | | |
|---|---|---|
| B01D 46/00 | (2022.01) | |
| B01D 39/16 | (2006.01) | |
| B01D 46/48 | (2006.01) | |
| B01D 46/71 | (2022.01) | |
| F02M 35/02 | (2006.01) | |
| F02M 35/024 | (2006.01) | |
| F02M 35/08 | (2006.01) | |

(52) U.S. Cl.
CPC ......... *B01D 46/71* (2022.01); *B01D 39/1692* (2013.01); *B01D 46/48* (2013.01); *B01D 2265/06* (2013.01); *F02M 35/02* (2013.01); *F02M 35/02466* (2013.01); *F02M 35/08* (2013.01)

(58) Field of Classification Search
CPC .... B01D 46/71; B01D 46/48; B01D 46/2411; B01D 46/64; B01D 39/1692; B01D 39/083; B01D 39/1623; B01D 2265/06; F02M 35/02; F02M 35/02466; F02M 35/08
USPC .......................................... 55/282, 490–519
See application file for complete search history.

(56) References Cited

U.S. PATENT DOCUMENTS

| | | | | |
|---|---|---|---|---|
| 5,858,044 | A | * | 1/1999 | Nepsund .............. F02M 35/024 55/486 |
| 6,602,308 | B1 | | 8/2003 | Carle et al. |
| 9,192,885 | B2 | | 11/2015 | Blossey et al. |
| 9,339,750 | B2 | | 5/2016 | Eberle |
| 10,512,867 | B2 | | 12/2019 | Donauer |
| 2011/0011042 | A1 | * | 1/2011 | Gillingham ............ B01D 46/48 55/302 |
| 2011/0252964 | A1 | * | 10/2011 | Wahlquist .............. B01D 46/48 95/20 |

(Continued)

FOREIGN PATENT DOCUMENTS

| | | | | | |
|---|---|---|---|---|---|
| CN | 108071529 | A | * | 5/2018 | ....... F02M 35/02416 |
| DE | 102016002954 | A1 | | 9/2016 | |

(Continued)

*Primary Examiner* — T. Bennett McKenzie

(57) ABSTRACT

A secondary filter element for a filter system for filtering a gaseous fluid, in particular for a self-cleaning intake air filter system of a motor, has a filter medium which in the intended operation is flowed through by the fluid from an intended inflow side to an intended outflow side. The secondary filter element has a support element covering the filter medium at the intended inflow side. A filter system with such a secondary filter element is provided.

13 Claims, 6 Drawing Sheets

(56) References Cited

U.S. PATENT DOCUMENTS

| | | | |
|---|---|---|---|
| 2011/0289894 A1* | 12/2011 | Nicholas | B01D 39/086 |
| | | | 55/486 |
| 2012/0031832 A1 | 2/2012 | Yamaguchi et al. | |
| 2012/0211411 A1* | 8/2012 | Hopkins | B01D 39/1623 |
| | | | 210/333.01 |
| 2013/0327218 A1 | 12/2013 | Izzi et al. | |
| 2020/0179852 A1 | 6/2020 | Stark | |

FOREIGN PATENT DOCUMENTS

| | | |
|---|---|---|
| DE | 102016004317 A1 | 10/2017 |
| DE | 102020101935 A1 | 7/2021 |
| EP | 1938884 A1 | 7/2008 |
| WO | WO-2018001892 A1 * | 1/2018 |

* cited by examiner

SECONDARY FILTER ELEMENT AND FILTER SYSTEM

BACKGROUND OF THE INVENTION

The invention concerns a secondary filter element for a filter system for filtering a gaseous fluid, in particular for a self-cleaning intake air filter system of a motor, as well as a filter system for filtering a gaseous fluid, in particular for a self-cleaning intake air filter system of a motor, with a secondary filter element.

DE 10 2019 132 361 A1 discloses a filter device which is used for gas filtration, for example, for filtration of air. The filter device comprises a filter housing and a filter element that is received in the filter housing and at least partially encloses a flow chamber. The filter element comprises a filter body which is flowed through by the fluid to be purified radially from the exterior to the interior so that the inwardly positioned flow chamber which is at least partially enclosed by the filter body forms the clean chamber for receiving the purified fluid. The purified fluid that is received in the inwardly positioned flow chamber is discharged via a flow socket from the filter device. In the wall of the flow socket, at least one opening is provided adjacent to which a fastening flange is arranged at the flow socket. The fastening flange serves for detachable attachment of a purging gas pipe of a purging device with which deposits can be cleaned off from the filter body. By means of the purging gas pipe of the purging device, a purging medium is introduced under pressure into the inwardly positioned flow chamber, whereupon the deposits at the outer side of the filter body are detached due to the pressure pulse of the purging medium.

SUMMARY OF THE INVENTION

It is an object of the invention to create a robust and cost-efficient secondary filter element for a filter system for filtering a gaseous fluid, in particular for a self-cleaning intake air filter system of a motor.

A further object is providing a filter system with such a robust and cost-efficient secondary filter element.

The aforementioned object is solved according to an aspect of the invention by a secondary filter element for a filter system for filtering a gaseous fluid, in particular for a self-cleaning intake air filter system of a motor, with a filter medium which is flowed through by the fluid from an inflow side to an outflow side in the intended operation, wherein the filter medium is covered by a support element at the intended inflow side.

The further object is solved by a filter system for filtering a gaseous fluid, in particular for a self-cleaning intake air filter system of a motor, with a purging device which is configured for temporary emission of a pressure pulse of a purging medium from the clean side to a raw side and with a secondary filter element which is arranged at a clean side of a primary filter element, with a filter medium which is flowed through by the fluid from an inflow side to an outflow side in the intended operation, wherein the filter medium is covered by a support element at the intended inflow side.

Beneficial configurations and advantages of the invention result from the additional claims, the description, and the drawing.

According to an aspect of the invention, a secondary filter element for a filter system for filtering a gaseous fluid, in particular for a self-cleaning intake air filter system of a motor, is proposed, with a filter medium which is flowed through by the fluid from an inflow side to an outflow side in the intended operation. In this context, the filter medium is covered by a support element at the intended inflow side.

In order to be able to clean off deposits at the raw side from the filter body of a filter system in a filter system with self-cleaning action, also referred to as back-washing, the filter system can be provided with a purging device with which a purging medium, for example, a purging gas, is introduced at the clean side through an outflow socket of the filter system into the inwardly positioned flow chamber, wherein the purging medium flows through the wall of the filter body from the clean side to the raw side and detaches deposits at the raw side by means of a pressure pulse. The purging device comprises a pipe elbow that projects through an opening in the wall of the outflow socket and is connected to the outflow socket.

When a secondary filter element is arranged as a safety element at the clean side of the primary filter element, the pressure pulse passes first through the secondary filter element before it impacts on the filter body of the primary filter element. In this context, the filter medium of the secondary filter element, which, for example, is embodied as a thin nonwoven layer, can bulge opposite to the intended flow direction due to the pressure pulse of the purging medium and possibly become damaged. In order to minimize this risk, the filter medium according to the invention is covered by a support element at the inflow side. In this way, bulging and thus a possible crack formation of the filter medium can be avoided.

In order to brake or dampen as little as possible an impulse or pressure pulse upon back-washing, preferably a very open nonwoven can be used as a filter medium of the secondary filter element. In order to avoid damages by an expansion or movement or ballooning of the nonwoven, advantageously a radially outwardly positioned protective net or grid, for example, of plastic material, can be applied. In this way, the filter medium can be stabilized without effecting too large a pressure increase at the same time.

The secondary filter element can be embodied as a round element or, alternatively, as a flat element. In case of a round element, the filter medium, for example, a nonwoven, can be wound around a central pipe and welded. In case of a flat element, the filter medium can be arranged on a support body.

According to a beneficial configuration of the secondary filter element, the support element can be embodied as a grid and/or as a perforated sheet. Advantageously, a grid and/or a perforated sheet can prevent bulging of the filter medium opposite to the intended inflow direction of the secondary filter element. Through the openings of the grid between the grid stays or through the openings of the perforated sheet, the fluid to be filtered as well as the purging medium can pass, provided the openings are large enough and the open surface of the grid or perforated sheet is sufficiently dimensioned.

According to a beneficial configuration of the secondary filter element, the support element can be embodied of a plastic material. In particular, the support element can be embodied of polyethylene, preferably of high-density polyethylene. Advantageously, the support element can be manufactured of plastic material. In this way, the suitable mesh widths can be produced in a favorable way so that, despite the stabilizing action of the support element, a satisfactory permeability for the fluid to be filtered and the purging gas is provided. Also, a desired minimal weight of the support element can be realized with the plastic material.

According to a beneficial embodiment of the secondary filter element, the support element can be configured with a proportion of an open surface provided for flow therethrough to a closed surface of at most 85%, preferably at most 70%, particularly preferred at most 60%. With the indicated surface ratios, despite the stabilizing action of the support element, a satisfactory permeability for the fluid to be filtered and the purging gas can be realized so that a predetermined maximum pressure loss for the fluid to be filtered through the filter system can be observed.

According to a beneficial embodiment of the secondary filter element, the support element can be fixedly connected to the filter medium. In particular, the support element can be fixedly connected to an end disk of the secondary filter element, in particular embedded by foaming. In this manner, the support element is fixedly connected to the filter medium so that, when servicing or exchanging the secondary filter element, the support element automatically is exchanged also. Preferably, the support element, when a foamed end disk as an end member of the secondary filter element is provided, can thus be embedded during the foaming process. In this way, an inexpensive manufacture of the secondary filter element can be achieved while providing a permanent connection of the support element with the filter medium at the same time.

According to a beneficial embodiment of the secondary filter element, the support element can be placed or pushed onto the inflow side of the filter medium. In this context, the support element can be connected to the filter medium at an outer edge, for example, can be glued.

According to a beneficial embodiment of the secondary filter element, the filter medium can be arranged on a radially outer side of a hollow cylinder-shaped central tube along a longitudinal axis. In this context, the filter medium, which, for example, is embodied as a nonwoven, can be wound about the central tube and welded. In this context, in the intended operation in the filter system, the radially outer side of the filter medium is embodied as an inflow side. In a preferred embodiment, the secondary filter element can be configured as a round element in the form of a hollow cylinder and, in the intended operation, is flowed through by the fluid to be purified from the radially outer side to the interior. The purging gas, on the other hand, passes from the interior radially to the exterior through the filter medium. The support element is arranged in this context at the radially outer side of the filter medium in order to support the filter medium against the pressure pulse of the purging gas.

According to a beneficial embodiment of the secondary filter element, the support element can be embodied hollow cylinder-shaped about the filter medium at the inflow side. The purging gas in turn passes from the interior radially to the exterior through the filter medium. The support element in this context is arranged at the radially outer side of the filter medium in order to support the filter medium against the pressure pulse of the purging gas. In this context, the support element can be pulled, for example, like a stocking, across the filter medium arranged on the central tube.

According to a beneficial embodiment of the secondary filter element, the support element can be placed as flat material around the filter medium at the inflow side and connected along a seam. In an alternative embodiment, the support element can also be simply placed or pushed from the radially outer side onto the filter medium, wherein the abutting ends, for example, can be welded and thereby form a seam.

According to a beneficial embodiment of the secondary filter element, the central tube can comprise at least one open end, wherein, adjacent to the open end on a circumference, a closed region with an axial length is formed which covers at least one impact point of a pressure pulse of a purging medium of a purging device of the filter system that is impacting, originating from the open end, at a slant to the longitudinal axis on the central tube. Due to the closed region, which can be configured also as a ring about an outlet nozzle of the purging device, the impact of too large a pressure pulse of the purging gas on the filter medium can be prevented. In this way, the risk that the filter medium is damaged by the pressure pulse of the purging gas can be advantageously reduced.

According to a further aspect of the invention, a filter system for filtering a gaseous fluid, in particular for a self-cleaning intake air filter system of a motor, is proposed, with a purging device, which is configured for temporary emission of a pressure pulse of a purging medium from the clean side to the raw side, and with a secondary filter element which is arranged at a clean side of a primary filter element, with a filter medium which in the intended operation is flowed through by the fluid from an inflow side to an outflow side. In this context, the filter medium is covered by a support element at the intended inflow side.

In order to be able to clean off deposits at the raw side from the filter body of the primary filter element in the filter system with self-cleaning action, the filter system can be provided with a purging device with which a purging medium, for example, a purging gas, is introduced at the clean side through an outflow socket of the filter system into the inwardly positioned flow chamber, wherein the purging medium flows through the wall of the filter body from the clean side to the raw side and detaches deposits at the raw side by means of a pressure pulse. The purging device comprises a pipe elbow that projects through an opening in the wall of the outflow socket and is connected to the outflow socket.

The pressure pulse of the purging gas passes first through the secondary filter element before it impacts on the filter body of the primary filter element. In this context, the filter medium of the secondary filter element, which is embodied, for example, as a thin nonwoven layer, can bulge due to the pressure pulse of the purging gas opposite to the intended flow direction and possibly become damaged. In order to minimize this risk, the filter medium is covered in accordance with the invention by a support element at the inflow side. In this way, bulging and thus a possible crack formation of the filter medium can be prevented.

According to a beneficial configuration, the filter system can comprise a hollow cylinder-shaped primary filter element which in the intended operation can be flowed through by the fluid from a radially outer side to an inner side, wherein the secondary filter element is arranged at the inner side of the primary filter element. In this context, the filter medium is arranged on a radially outer side of a hollow cylinder-shaped central tube along a longitudinal axis. In the intended operation, the radially outer side of the filter medium is configured as inflow side in the filter system.

In a preferred embodiment, the primary filter element and thus also the secondary filter element can be embodied as a round element in the form of a hollow cylinder and, in the intended operation, can be flowed through by the fluid to be purified from the radially outer side to the interior. The purging gas, on the other hand, passes from the interior radially to the exterior through the filter medium of the secondary filter element. The support element in this context is arranged at the radially outer side of the filter medium in order to support the filter medium against the pressure pulse of the purging gas.

According to a beneficial embodiment of the filter system, the central tube can comprise at least one open end, wherein, adjacent to the open end on a circumference, a closed region with an axial length is formed which covers at least one impact point of a pressure pulse of the purging medium of the purging device that is impacting, originating from the open end, at a slant to the longitudinal axis on the central tube. Due to the closed region which can also be embodied as a ring about an outlet nozzle of the purging device, the impact of too large a pressure pulse of the purging gas on the filter medium can be prevented. In this way, the risk that the filter medium becomes damaged by the pressure pulse of the purging gas can be advantageously reduced.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

The drawings show embodiments in an exemplary fashion.

DESCRIPTION OF PREFERRED EMBODIMENTS

Figure 1:
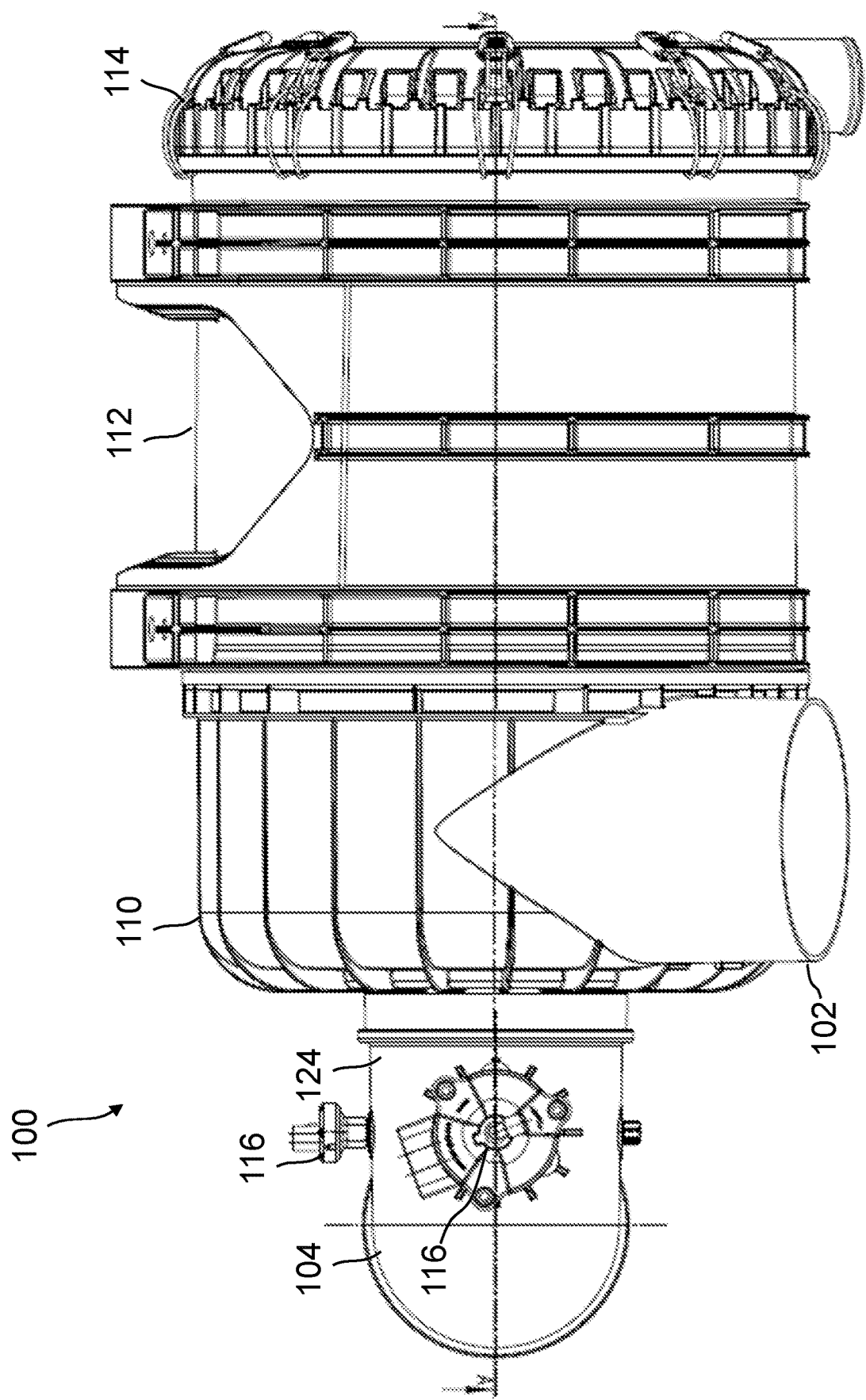
FIG. 1 shows a side view of a filter system for filtering a gaseous fluid, in particular for a self-cleaning intake air filter system of a motor, according to an embodiment of the invention.

In the Figures, same or same type components are identified with same reference characters. The Figures show only examples and are not to be understood as limiting.

Directional terminology used in the following with terms like "left", "right", "top", "bottom", "in front of", "behind", "downstream" and the like serve only for better understanding of the Figures and are not to be understood in any way as a limitation. The illustrated components and elements, their configuration and use can vary in the sense of considerations of a person of skill in the art and can be adapted to the respective applications.

Figure 2:
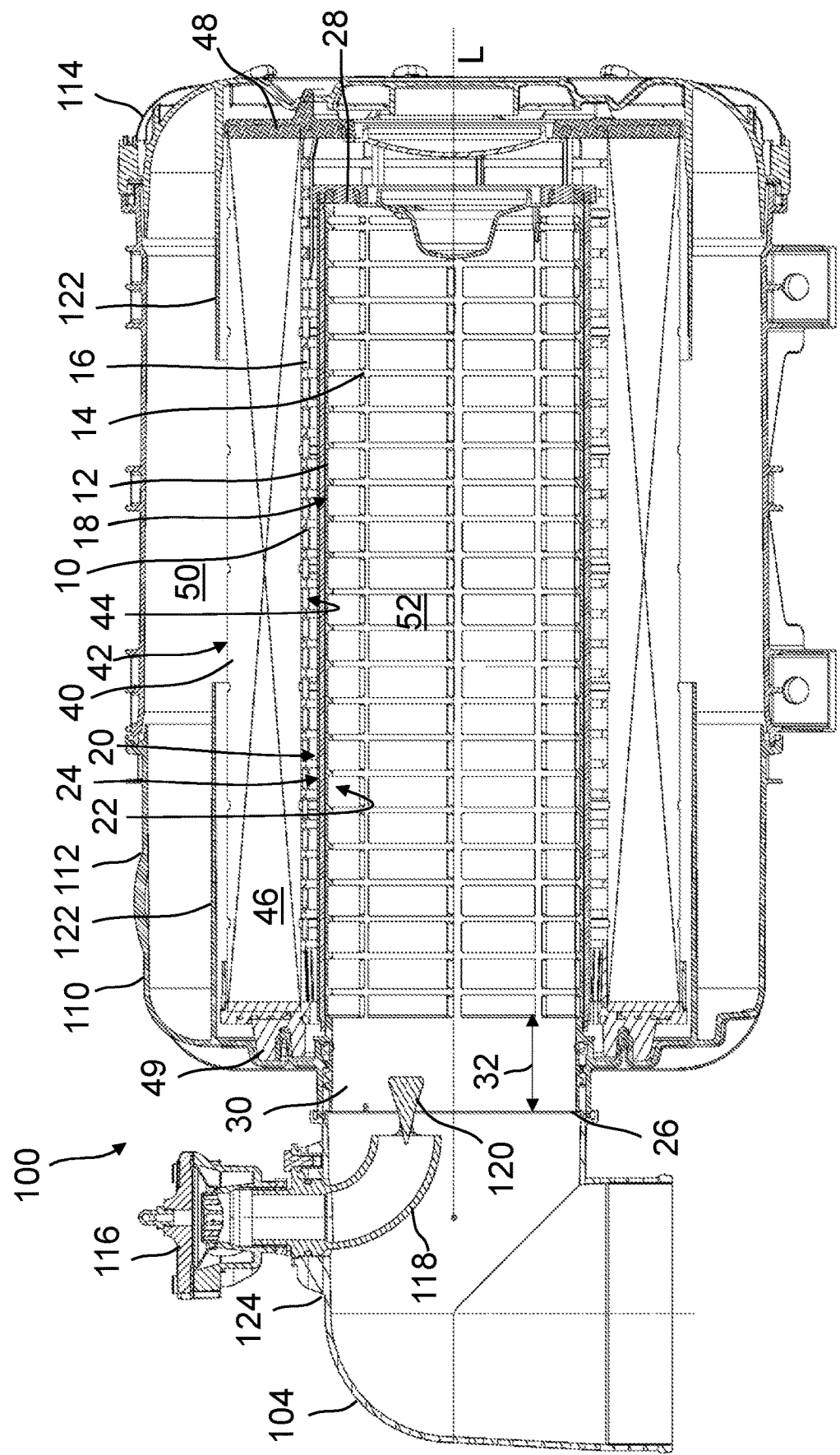
FIG. 2 shows a longitudinal section through the filter system according to FIG. 1.

FIG. 1 shows a side view of a filter system 100 for filtering a gaseous fluid, in particular for a self-cleaning intake air filter system of a motor, according to an embodiment of the invention, while in FIG. 2 a longitudinal section of the filter system 100 is illustrated.

The filter system 100 comprises a hollow cylinder-shaped primary filter element 40 which in the intended operation is flowed through from a radially outer side 42 to an inner side 44 by the fluid to be purified. The primary filter element 40 comprises a filter body 46 that is closed at both ends by a respective end disk 48, 49. The primary filter element 40 is clamped with the end disks 48, 49 against the filter housing 110 which is comprised of a housing top part 112 and a housing bottom part 114. By means of the end disks 48, 49, the raw side 50 is also sealed against the clean side 52 of the filter system 100.

The secondary filter element 10 is arranged at the inner side 44 of the primary filter element 40 and thus at the clean side 52. The secondary filter element 10 comprises a filter medium 12, for example, a nonwoven layer, and is flowed through by the fluid in the intended operation from an inflow side 20 to an outflow side 22.

The filter medium 12 is arranged on a radially outer side 18 of a hollow cylinder-shaped central tube 14 along a longitudinal axis L. In the intended operation in the filter system 100, the radially outer side 24 of the filter medium 12 is embodied in this context as inflow side 20. The filter medium 12, which is embodied, for example, as a nonwoven, is wound about the central tube 14 and welded.

In order to be able to clean off deposits at the raw side from the filter body 46 of a primary filter element 40 in a filter system 100 with self-cleaning action, also referred to as back-washing, the filter system 100 can be provided with a purging device 116 with which a purging medium, for example, a purging gas, is introduced at the clean side 52 via an outlet socket 124 of the filter system 100 into the inwardly positioned flow chamber, wherein the purging medium flows through the wall of the filter body 42 from the clean side 52 to the raw side 50 and detaches deposits at the raw side 50 by means of a pressure pulse.

The here illustrated filter system 100 is of a self-cleaning embodiment and comprises a purging device 116 which is embodied for temporary emission of a pressure pulse of a purging gas as purging medium from the clean side 52 to the raw side 50.

The cleaning device 116 comprises a pipe elbow 118 that is projecting through an opening in the wall of the outflow socket 124 and is connected to the outlet socket 124.

The filter system 100 can comprise advantageously a plurality of purging devices 116 that are distributed about the circumference of the outflow socket 124.

The filter medium 12 is covered at the intended inflow side 20 by a support element 16 in order to protect the filter medium 12 in this way against the pressure pulse of the purging gas and to prevent bulging of the filter medium 112 or even a damage of the filter medium 12.

For this purpose, the support element 16 is embodied in a hollow cylinder shape about the filter medium 20 arranged on the central tube 14 at the inflow side 20.

The filter housing 110 of the filter system 100 comprises an inflow guard 122 arranged radially about the primary filter element 40 which imparts a swirl flow to the fluid flowing in through the inlet 102 and shields the filter body 46 against flow pressure of the fluid. Due to the swirl flow, large dirt particles can deposit in the filter housing 110 and can be suitably discharged.

Figure 3:
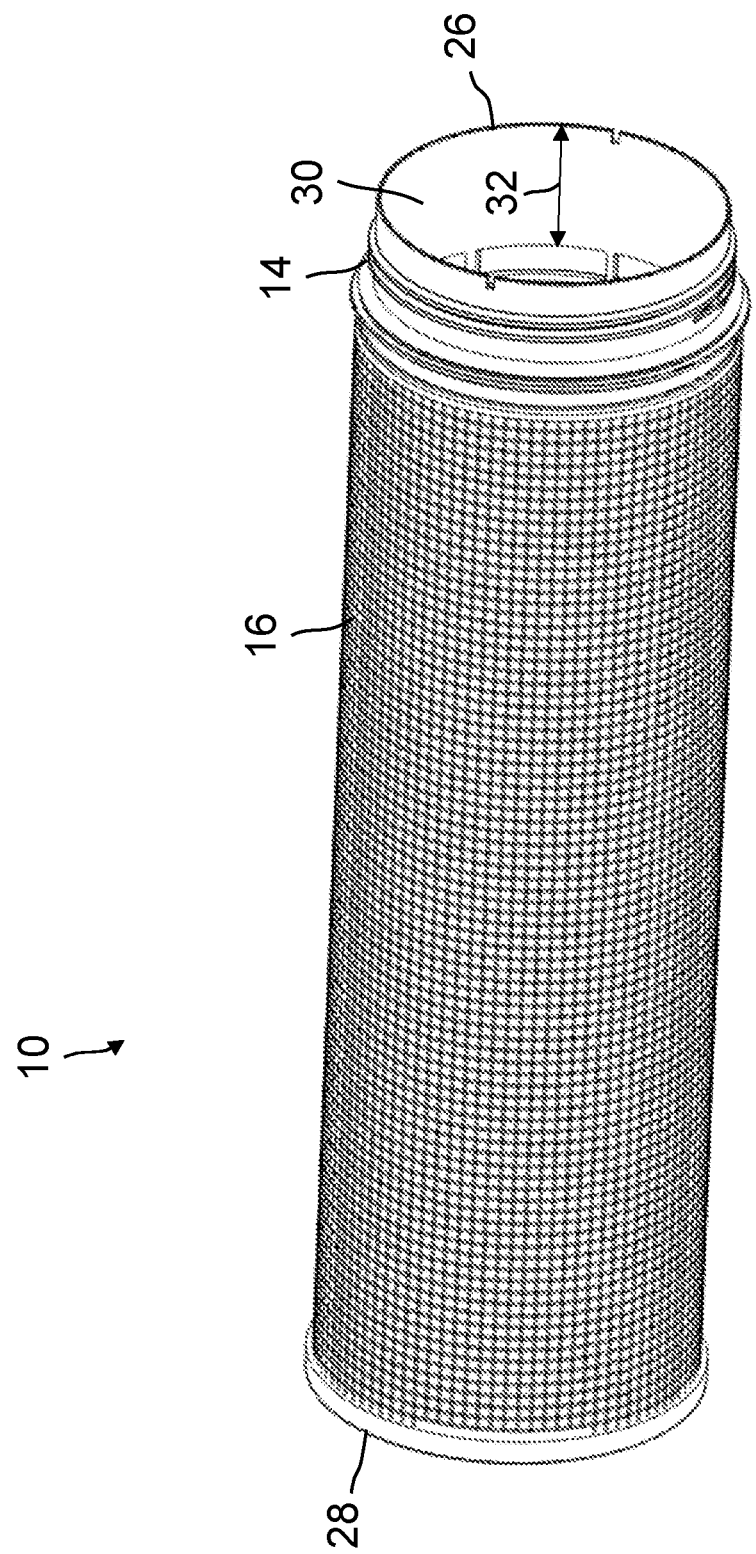
FIG. 3 shows an isometric view of a secondary filter element according to an embodiment of the invention.
Figure 4:
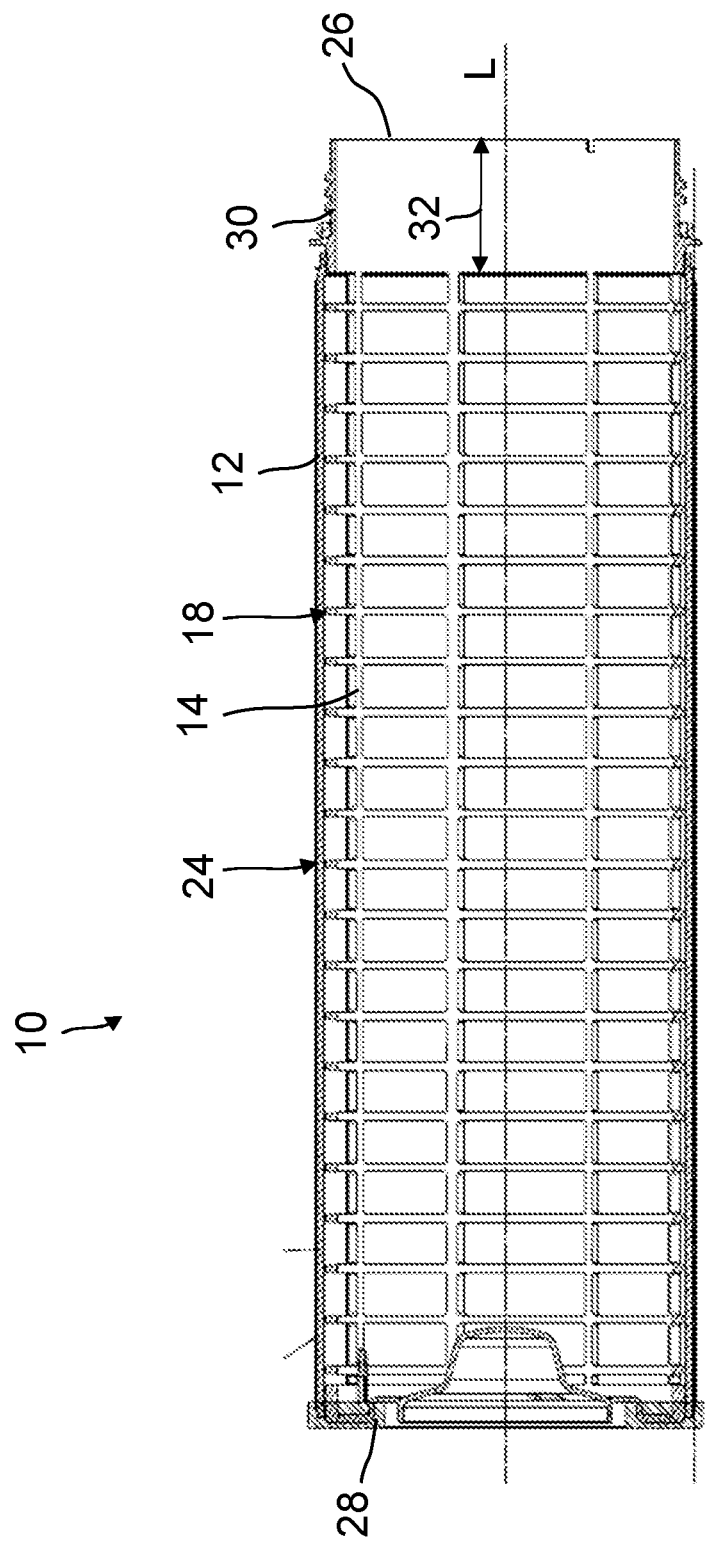
FIG. 4 shows a longitudinal section of the secondary filter element according to FIG. 3 without support element.

FIG. 3 shows an isometric view of the secondary filter element 10 according to an embodiment of the invention, while in FIG. 4 a longitudinal section of the secondary filter element 10 without support element 16 is illustrated.

The support element 16, which is arranged in the form of a hollow cylinder about the secondary filter element 10, can be embodied advantageously as a grid, as illustrated in the embodiment in FIG. 3. Alternatively, it is also possible that the support element 16 is configured as a perforated sheet.

The support element 16 is preferably embodied of a plastic material. In this context, in particular polyethylene, preferably high-density polyethylene (HDPE), can be used.

The support element 16 can advantageously be provided with a proportion of an open surface for flow therethrough to a closed surface of at most 85%, preferably at most 70%, particularly preferred at most 60%, in order to provide a beneficial stabilization of the filter medium 12 against the pressure pulse of the purging gas of the purging device. With the indicated surface ratios, despite the stabilizing action of the support element 16, a satisfactory permeability for the fluid to be filtered and the purging gas can be realized so that a predetermined maximum pressure loss for the fluid to be filtered through the filter system 100 can be observed.

The support element 16 can be fixedly connected to the filter medium 12, for example. In particular, the support element 16 can be fixedly connected to an end disk 28 of the filter medium 12, as illustrated in FIG. 3. In this context, the support element 16 can be expediently embedded by foaming when producing the end disk 28.

In an alternative embodiment, the support element 16 can be placed or pushed onto the inflow side 20 of the filter medium 12 and, for example, can be connected, for example, glued, at the rims to the filter medium 12. The support element 16 can thus be placed as a flat material about the filter medium 12 at the inflow side 20 and can be connected along a seam, for example, welded.

Figure 5:
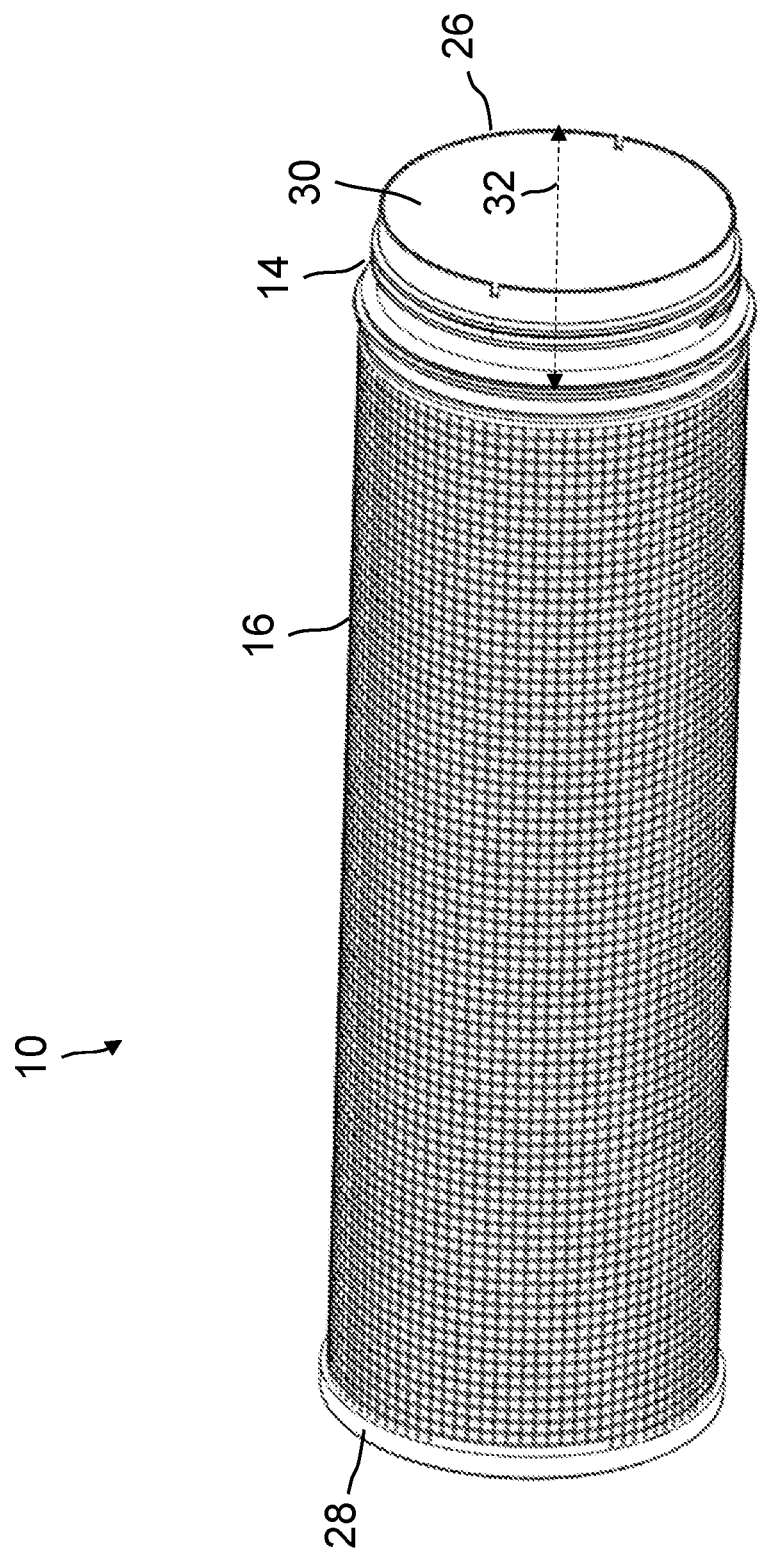
FIG. 5 shows an isometric view of a secondary filter element according to a further embodiment of the invention.
Figure 6:
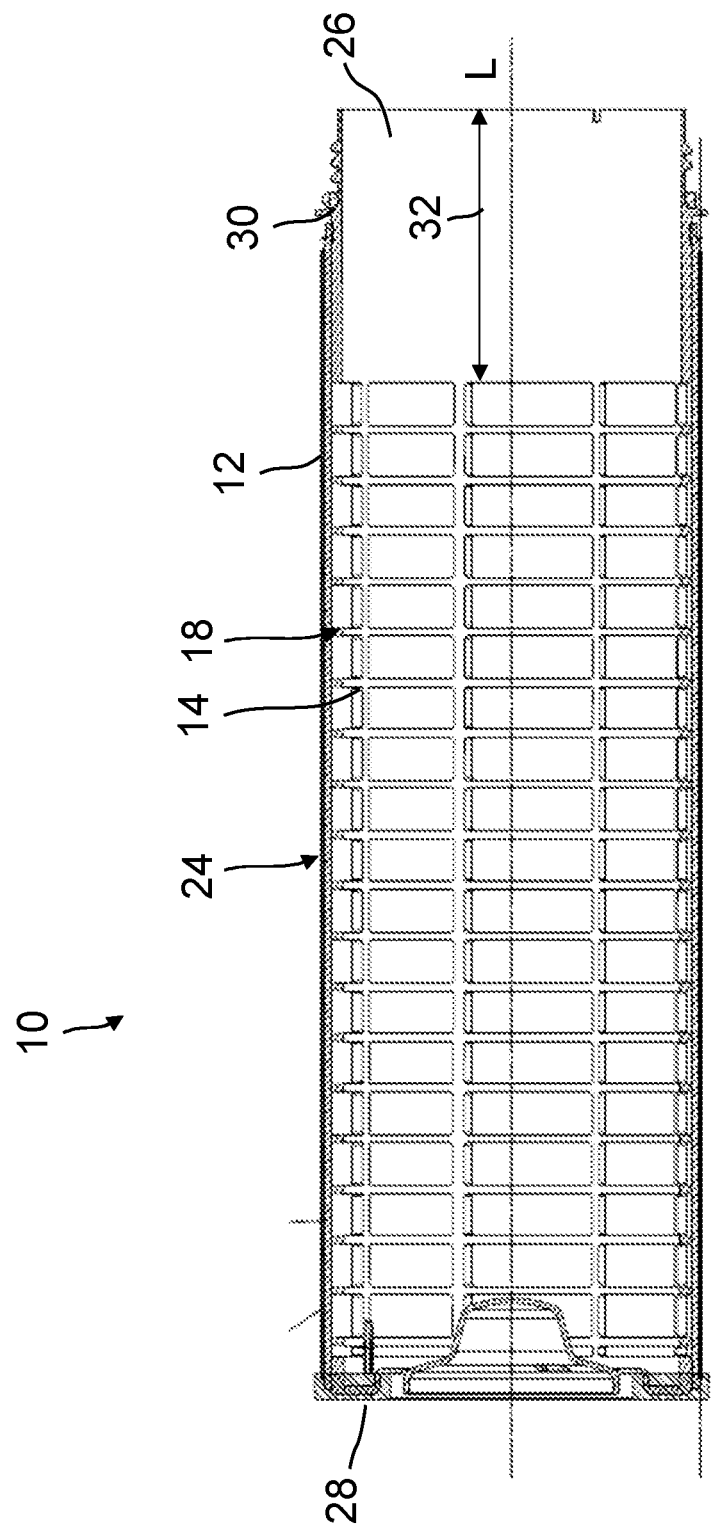
FIG. 6 shows a longitudinal section of the secondary filter element according to FIG. 5 without support element.

FIG. 5 shows an isometric view of a secondary filter element 10 according to a further embodiment of the invention, while in FIG. 6 a longitudinal section through the secondary filter element 10 according to FIG. 5 without support element is illustrated.

The embodiment of the secondary filter element 10 illustrated in FIGS. 5 and 6 deviates from the embodiment illustrated in FIGS. 3 and 4 in that, adjacent to the open end 26 of the central tube 14, as can be seen in particular in FIG. 6, a closed region 30 with an axial length 32 is formed on a circumference immediately adjoining the open end 26. In this context, the length 32 of the region 30 is advantageously selected such that at least one impact point of the pressure pulse of the purging medium of the purging device 116 that is impacting, originating from the open end 26, at a slant to the longitudinal axis L on the central tube 14 is covered, upon use in the filter system 100 (see FIG. 2). In this way, it can be prevented that the relatively hard pressure pulse of the purging gas impacts directly through the central tube 14 on the filter medium 12 and possibly damages it. In an alternative embodiment, the region 30 could also be designed as a ring which only covers the region of the impact point and is not extended along the central tube 14 all the way to the open end 26.

The impact point of the purging gas can be visualized, for example, in FIG. 2 in that a projection of a circumferential wall of the cone-shaped diffuser 120, which is arranged at the exit of the purging pipe 118 of the purging device 116, on the central tube 14 is carried out.

In comparison, the region 30 of the central tube 14 of the embodiment illustrated in FIG. 4 has a significantly shorter axial length 32 so that here the impact point of the purging gas would not be covered by the region and a damage of the filter medium 12 could possibly not be excluded therefore over the duration of operation.

LIST OF REFERENCE CHARACTERS 10 secondary element
12 filter medium
14 central tube
16 support element
18 radially outer side
20 inflow side
22 outflow side
24 radially outer side
26 open end
28 end disk
30 region
32 length
40 primary filter element
42 radially outer side
44 inner side
46 filter body
48 end disk
49 end disk
50 raw side
52 clean side
100 filter system
102 inlet
104 outlet
110 filter housing
112 housing top part
114 housing bottom part
116 purging device
118 purging pipe
120 diffuser
122 inflow guard
124 outflow socket
L longitudinal axis

What is claimed is:

1. A filter system for filtering a gaseous fluid and for pressure pulse self-cleaning in an air filtration system, comprising:
    a purging device configured for applying a back-washing cleaning pressure pulse; and
    a secondary filter element, comprising:
        a hollow cylinder-shaped central tube extending along and surrounding a longitudinal axis and having an open end,
        wherein, adjacent to the open end on a circumference of the hollow cylinder-shaped central tube, a circumferentially closed region having an axial length is formed;
        a filter medium arranged on and closing about a radially outer side of the hollow cylinder-shaped central tube, configured for the gaseous fluid to flow from a radially outer side of the filter medium to a radially inner side of the filter medium;
        wherein the radially outer side of the filter medium is an inflow side of the filter medium and
        the radially inner side of the filter medium is an outflow side of the filter medium; and
        wherein the circumferentially closed region covers at least one impact point of the back-washing cleaning pressure pulse applied by the purging device to impact the circumferentially closed region, thereby reducing a risk of damage to the filter medium from the back-washing cleaning pressure pulse;
        wherein the at least one impact point is arranged on the axial length of the circumferentially closed region between the filter medium and the open end of the hollow cylinder-shaped central tube;
        wherein the purging device comprises a purging pipe having a cone shaped diffuser adjacent an outlet end of the purging pipe, the cone shaped diffuser is configured to direct the back-washing cleaning pressure pulse onto the at least one impact point arranged on the axial length of the circumferentially closed region; and a support element arranged at and closing about the inflow side of the filter medium and having flow-through openings, wherein the support element has a proportion of an open surface provided for the flow-through openings to a closed surface of at most 85%, such that the support element covers and closes off at least 15% of a flow area of the inflow side of the filter medium, supporting and stabilizing the filter medium against the back-washing cleaning pressure pulse applied by the purging device.

2. The filter system according to claim 1, wherein the support element is a grid and/or a perforated sheet.

3. The filter system according to claim 1, wherein the support element is comprised of a plastic material.

4. The filter system according to claim 3, wherein the plastic material comprises polyethylene.

5. The filter system according to claim 4, wherein the polyethylene is a high-density polyethylene.

6. The filter system according to claim 1, wherein the proportion of the open surface provided for the flow-through openings to the closed surface is at most 70%, such that the support element covers and closes off at least 30% of the flow area of the inflow side of the filter medium.

7. The filter system according to claim 6, wherein the proportion of the open surface provided for the flow-through openings to the closed surface is at most 60%, such that the support element covers and closes off at least 40% of the flow area of the inflow side of the filter medium.

8. The ter system according to claim 1, wherein the support element is fixedly connected to the filter medium.

9. The filter system according to claim 8, wherein the support element is fixedly connected to an end disk of the filter medium.

10. The filter system according to claim 1, wherein the support element is configured to be placed or pushed onto the radially outer side of the filter medium which forms the inflow side of the filter medium.

11. The filter system according to claim 1, wherein the support element is a flat material disposed circumferentially around the filter medium at the inflow side of the filter medium and connected along a seam.

12. The filter system according to claim 1, further comprising:
   a primary filter element providing a clean side and a raw side;
   wherein the secondary filter element is arranged at the clean side of the primary filter element; and
   wherein the purging device is configured to apply the back-washing cleaning pressure pulse onto the circumferentially closed region to detach deposits of particles from the raw side of the primary filter element and/or from the inflow side of the secondary filter element.

13. The filter system according to claim 12, wherein
   the primary filter element is a hollow cylinder-shaped primary filter element configured to be flowed through by the gaseous fluid from a radially outer side of the primary filter element to a radially inner side of the primary filter element, and
   wherein the secondary filter element is arranged at the radially inner side of the hollow cylinder-shaped primary filter element.

* * * * *